United States Patent [19]
Hirano et al.

[11] Patent Number: 5,896,425
[45] Date of Patent: Apr. 20, 1999

[54] NON-UNIFORMLY SPACED TONES FOR SYNCHRONIZATION WAVEFORM

[75] Inventors: Michael Hirano; Gregory J. Veintimilla, both of Redmond, Wash.

[73] Assignee: AT&T Wireless Services Inc., Kirkland, Wash.

[21] Appl. No.: 08/803,833

[22] Filed: Feb. 24, 1997

[51] Int. Cl.$^6$ .................... H04L 7/00; H04L 27/30
[52] U.S. Cl. ............................ 375/354; 375/207
[58] Field of Search .................... 375/364, 362, 375/207, 356, 354, 355, 209, 373, 200; 370/513, 503, 342, 343, 344, 350

[56] References Cited

U.S. PATENT DOCUMENTS

| | | | |
|---|---|---|---|
| 4,776,006 | 10/1988 | Comerford et al. | 375/356 |
| 5,121,408 | 6/1992 | Cai et al. | 375/267 |
| 5,184,347 | 2/1993 | Farwell et al. | 379/159 |
| 5,289,464 | 2/1994 | Wang | 375/260 |
| 5,377,223 | 12/1994 | Schilling | 375/200 |
| 5,400,368 | 3/1995 | Cheng et al. | 375/354 |
| 5,428,647 | 6/1995 | Rasky et al. | 375/366 |
| 5,519,692 | 5/1996 | Hershey et al. | 375/316 |
| 5,659,573 | 8/1997 | Bruckert et al. | 375/365 |

FOREIGN PATENT DOCUMENTS

WO 96 02991   2/1996   WIPO.

OTHER PUBLICATIONS

Henry Cox and Hung Lai, "Geometric Comb Waveforms for Reverberation Suppression", Proc. of the 28th Asilomar Conference on Signals, Systems and Computers, IEEE Computer Society, Oct. 30 to Nov. 2, 1994, pp. 1185–1189.

*Primary Examiner*—Temesghen Ghebretinsae
*Assistant Examiner*—Albert Park

[57] ABSTRACT

A method synchronizes a remote unit to a base station in a bandwidth efficient communication system and includes generating a clock signal at the base station. The clock signal is spread over a plurality of non-uniformly spaced discrete tones, thus creating a synchronization signal at the base station, which is transmitted from the base station and received at least one remote unit. Matched filtering is performed on the synchronization signal at the remote unit and the remote unit generates a remote clock signal synchronized with the synchronization signal, based on the matched filter output.

16 Claims, 3 Drawing Sheets

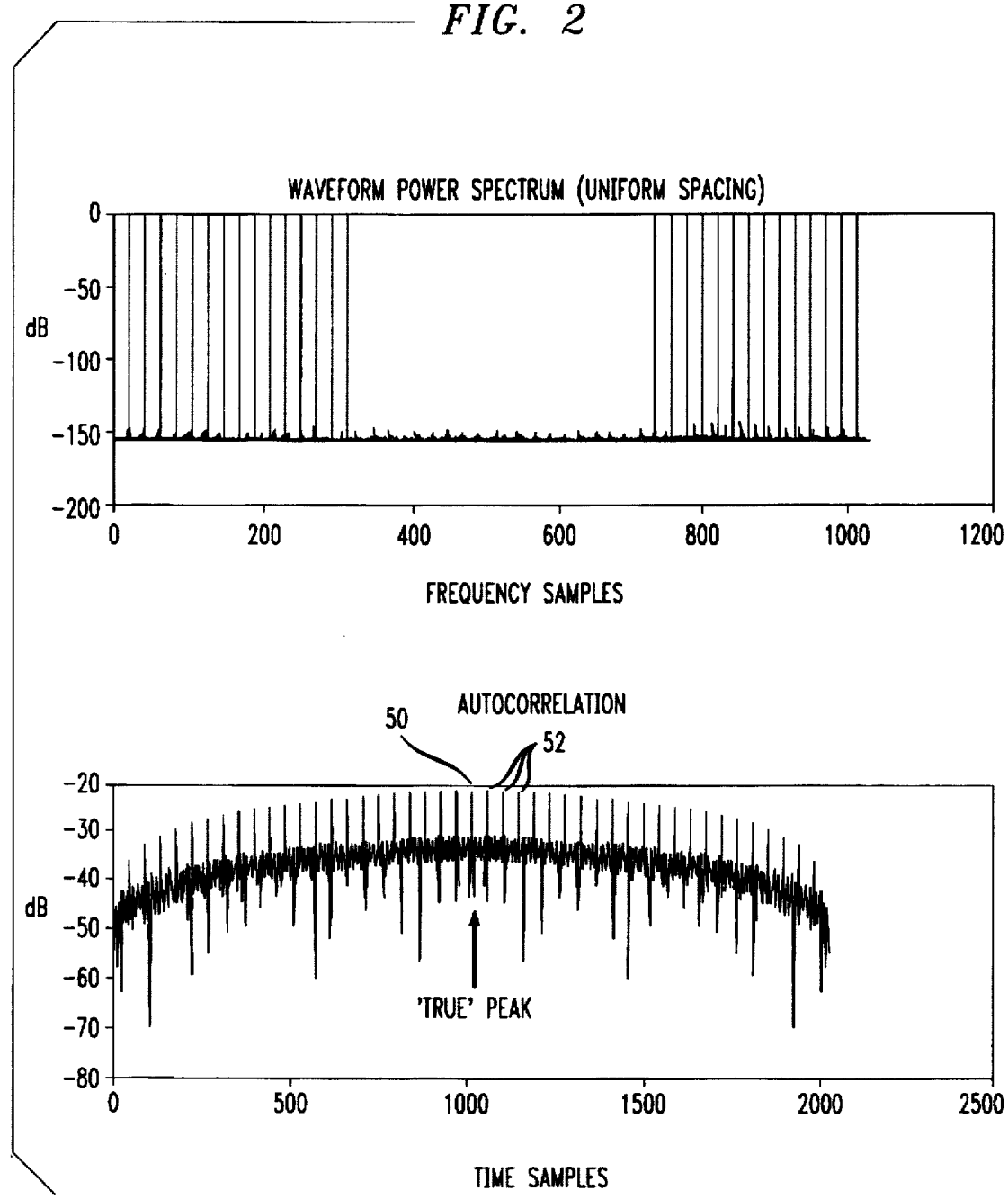

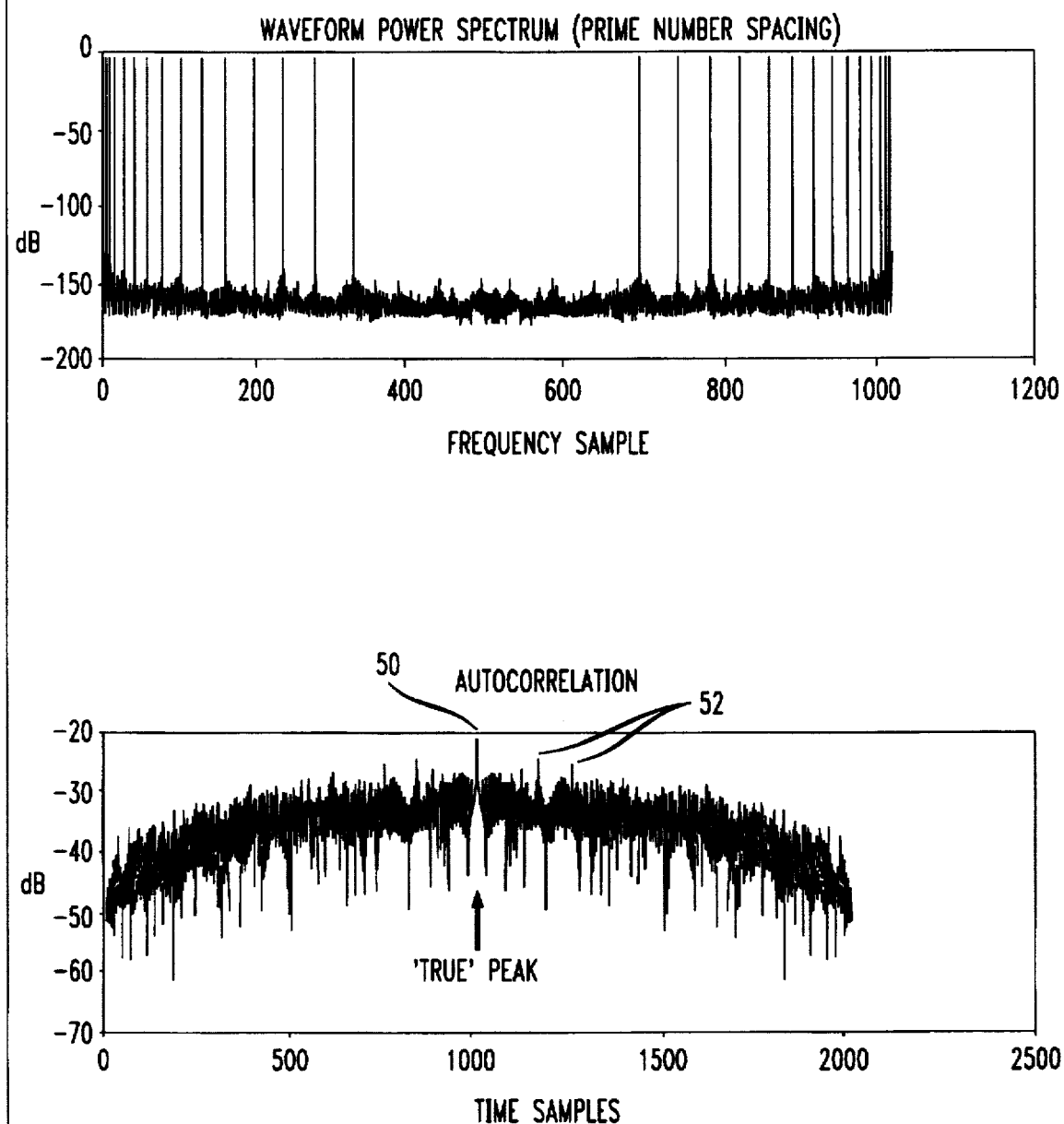

NON-UNIFORMLY SPACED TONES FOR SYNCHRONIZATION WAVEFORM

CROSS REFERENCES TO RELATED APPLICATIONS

The invention disclosed herein is related to the copending U.S. patent application by Siavash Alamouti, Doug Stolarz, and Joel Becker entitled "VERTICAL ADAPTIVE ANTENNA ARRAY FOR A DISCRETE MULTITONE SPREAD SPECTRUM COMMUNICATIONS SYSTEM", Ser. No. 08/806,510, filed on the same day as the instant patent application, assigned to AT&T Wireless Services, and incorporated herein by reference.

FIELD OF THE INVENTION

This invention involves improvements to communications systems and methods in a wireless discrete multitone spread spectrum communications system.

BACKGROUND OF THE INVENTION

Wireless communications systems, such as cellular and personal communications systems, operate over limited spectral bandwidths. They must make highly efficient use of the scarce bandwidth resource to provide good service to a large population of users. Code Division Multiple Access (CDMA) protocol has been used by wireless communications systems to efficiently make use of limited bandwidths. The protocol uses a unique code to distinguish each user's data signal from other users' data signals. Knowledge of the unique code with which any specific information is transmitted, permits the separation and reconstruction of each user's message at the receiving end of the communication channel.

The personal wireless access network (PWAN) system described in the referenced Alamouti, et al. patent application, incorporated herein by reference, uses a form of the CDMA protocol known as discrete multitone spread spectrum (DMT-SS) to provide efficient communications between a base station and a plurality of remote units. In this protocol, the user's data signal is modulated by a set of weighted discrete frequencies or tones. The weights are spreading codes that distribute the data signal over many discrete tones covering a broad range of frequencies. The weights are complex numbers with the real component acting to modulate the amplitude of a tone while the complex component of the weight acts to modulate the phase of the same tone. Each tone in the weighted tone set bears the same data signal. Plural users at the transmitting station can use the same tone set to transmit their data, but each of the users sharing the tone set has a different set of spreading codes. The weighted tone set for a particular user is transmitted to the receiving station where it is processed with despreading codes related to the user's spreading codes, to recover the user's data signal. For each of the spatially separated antennas at the receiver, the received multitone signals are transformed from time domain signals to frequency domain signals. Despreading weights are assigned to each frequency component of the signals received by each antenna element. The values of the despreading weights are combined with the received signals to obtain an optimized approximation of individual transmitted signals characterized by a particular multitone set and transmitting location. The PWAN system has a total of 2560 discrete tones (carriers) equally spaced in 8 MHZ of available bandwidth in the range of 1850 to 1990 MHZ. The spacing between the tones is 3.125 kHz. The total set of tones are numbered consecutively form 0 to 2559 starting from the lowest frequency tone. The tones are used to carry traffic messages and overhead messages between the base station and the plurality of remote units. The traffic tones are divided into 32 traffic partitions, with each traffic channel requiring at least one traffic partition of 72 tones.

In addition, the PWAN system uses overhead tones to establish synchronization and to pass control information between the base station and the remote units. A Common Link Channel (CLC) is used by the base to transmit control information to the Remote Units. A Common Access Channel (CAC) is used to transmit messages from the Remote Unit to the Base. There is one grouping of tones assigned to each channel. These overhead channels are used in common by all of the remote units when they are exchanging control messages with the base station.

In the PWAN system, Time Division Duplexing (TDD) is used by the base station and the remote unit to transmit data and control information in both directions over the same multi-tone frequency channel. Transmission from the base station to the remote unit is called forward transmission and transmission from the remote unit to the base station is called reverse transmission. The time between recurrent transmissions from either the remote unit or the base station is the TDD period. In every TDD period, there are four consecutive transmission bursts in each direction. Data is transmitted in each burst using multiple tones. The base station and each remote unit must synchronize and conform to the TDD timing structure and both the base station and the remote unit must synchronize to a framing structure. All remote units and base stations must be synchronized so that all remote units transmit at the same time and then all base stations transmit at the same time. When a remote unit initially powers up, it acquires synchronization from the base station so that it can exchange control and traffic messages within the prescribed TDD time format. The remote unit must also acquire frequency and phase synchronization for the DMT-SS signals so that the remote is operating at the same frequency and phase as the base station.

A problem in the PWAN system is how to efficiently synchronize a remote unit to the base station in a highly active DMT-SS system. What is needed are wave forms composed of individual tones that can give an optimal auto correlation for an unambiguous determination of the selective time delay of a remote unit attempting to come online. In addition, it would be desirable to select individual tones corresponding to the available tone set prescribed by the PWAN system.

SUMMARY OF THE INVENTION

It is an object of the present invention to produce a synchronization waveform by modulating a clock signal at a base station with non-uniformly spaced tones to improve the ability of the remote unit to time localize the synchronization waveform, and reject undesired harmonics. It is a further object of the present invention to improve tracking between a remote clock of the remote unit and the clock of the base station.

A method of synchronizing a remote unit to a base station in a bandwidth efficient communication system is disclosed, which includes: generating a clock signal at the base station; spreading the clock signal over a plurality of non-uniformly spaced discrete tones, thus creating a synchronization signal at the base station; transmitting the synchronization signal from the base station; receiving the synchronization signal at least one remote unit; performing matched filtering on the synchronization signal; and generating a remote clock signal in the remote unit, synchronized with the synchronization signal, based on the matched filtering step.

In a preferred embodiment of the invention, the non-uniformly spaced tones are space apart at prime number increments of a minimum frequency spacing. In an alternate embodiment of the invention, the non-uniformly space tones are spaced apart at increments corresponding to a fibonacci series of the minimum frequency spacing.

BRIEF DESCRIPTION OF THE DRAWINGS

FIG. 2 depicts a measured power spectrum and matched filtering of a synchronization signal modulated by 15 uniformly spaced tones.

FIG. 3 depicts a measured power spectrum and matched filtering of a synchronization signal modulated by 15 non-uniformly spaced tones using prime number increments of a fundamental minimum frequency spacing.

DETAILED DESCRIPTION OF THE PREFERRED EMBODIMENTS

System Overview

Figure 1:
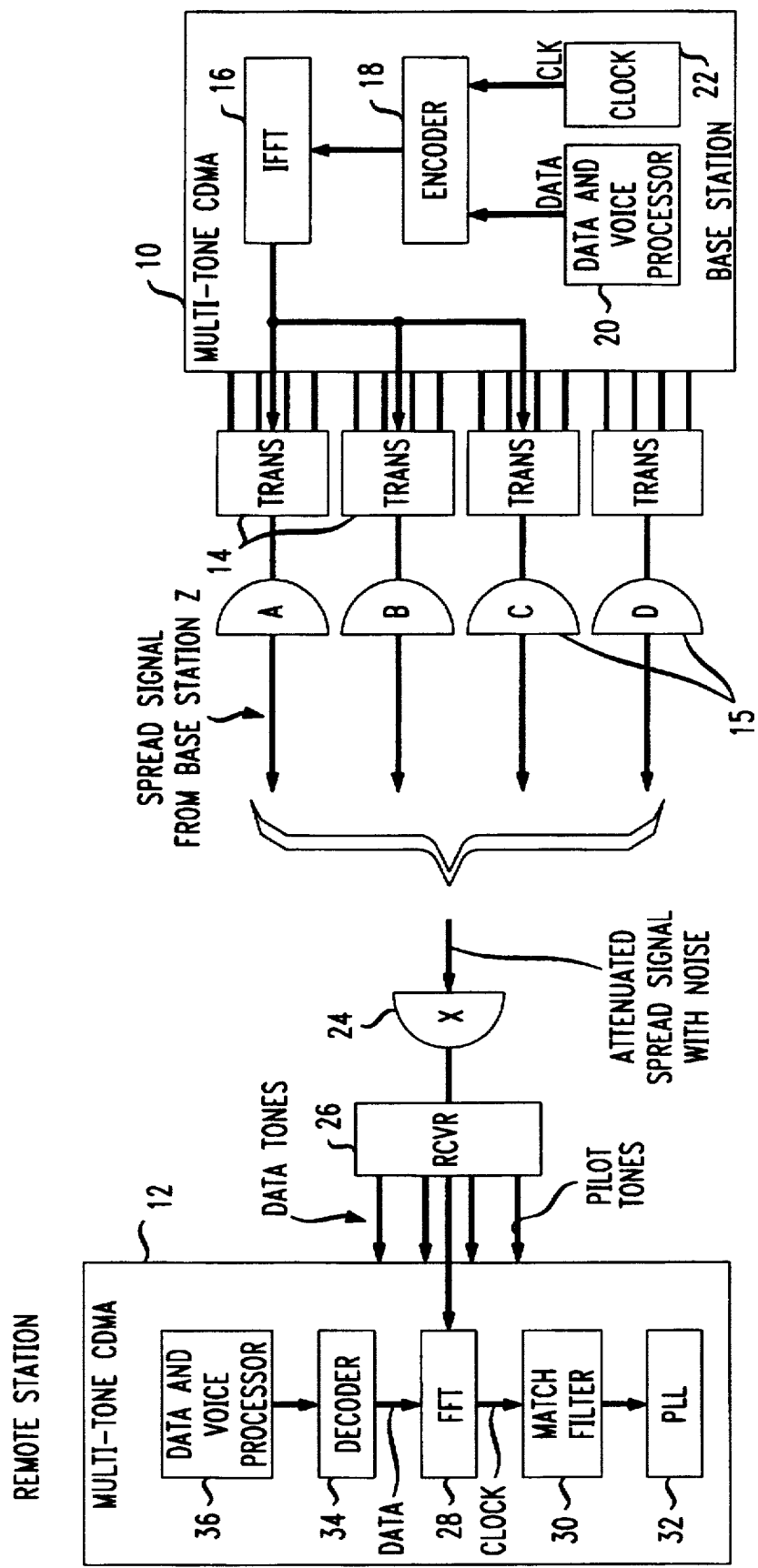
FIG. 1 depicts a PWAN communication system in which the invention finds application.

FIG. 1 depicts a base station z transmitting a spread signal to a remote station x. The base station z includes four transmitters and antennas, an inverse fast fourier transform (IFFT) block, and encoder, a data and voice processor, and a clock. The data and voice processor processes data and voice signals received in digital form from other base station or other inputs coupled into the base station z, including an integrated subscribers digital network (ISDN), plain old telephone service (POTS). The clock produces a clock signal which defines the forward and reverse transmission time intervals and framing structure defined by the TDD structure of the PWAN system. The clock signal may be generated by a precision oscillator. Alternatively, the clock signal may be generated based on clock information received remotely, over the ISDN for example, or based on clocks transmitted by the global positioning system (GPS). Both the clock signal and data are represented by digital information in the frequency domain.

The data is coupled to the encoder, which spreads the data signals over a plurality of available tones. In a preferred embodiment of the invention, 16 tones are generated from the clock signal. However, this set could be more or less depending on the requirements of the system. A set of non-uniformly spaced discrete tones is generated from the clock signal, creating a synchronization signal. Thus, the data and clock signals are modulated by the tone assignments. The output of the encoder is a frequency domain representation of the modulated synchronization signal, along with modulated data.

The output of the encoder is coupled to the IFFT which converts the data and synchronization signal into the time domain and transmits them through the transmitter and antenna array depicted in FIG. 1. The transmitter and antenna array is designed to form geographically desirable beams of signal transmission. Once the data and synchronization signal are transmitted through the air, they become attenuated as they travel and noise is added.

The remote station x includes an antenna, a receiver, fast fourier transform (FFT) block, a matched filter block, a phase locked loop, a decoder, and a data and voice processor. Situated at a distance away from the base station, the remote unit x receives the attenuated data and synchronization signal with noise from the base station z with the antenna and receiver. The FFT performs a fast fourier transform on the data and synchronization signal to convert from the time domain to the frequency domain. The matched filter block then performs matched filtering in the frequency domain according to the convolution theorem on the synchronization signal. Matched filtering is the process of convolving with a replica of the desired signal. The matched filter block may be implemented as a single matched filter, or may include an array of matched filters equal in number to or greater than the number of tones assigned to the synchronization signal. The matched filter block locates the peak power output from the match filtered synchronization waveform received from the base station z, and adjusts the signal timing prior to the phase locked loop.

The phase locked loop produces a remote clock that tries to exactly duplicate the phase and frequency of the synchronization waveform. The matched filter output is used to adjust the timing of the synchronization signal input to the phase locked loop, which determines the phase and frequency error in its remote clock signal, relative to the synchronization signal. Then, based on the phase and frequency error, the frequency and phase of the phase locked loop is changed to move the remote clock closer to the synchronization signal.

After the FFT stage, the data signal is coupled to the decoder which demodulates the data and voice transmitted from the base station z, and sends the demodulated data and voice to the data and voice processor for use by the remote unit x's user. The data and voice may be displayed or converted to sound respectively by the remote unit x.

Selection and Function of Non-uniformly Spaced Tones

The purpose of selecting non-uniformly spaced tones is to minimize harmonics in the autocorrelation function that produce high sidelobes relative to a main peak. The main peak is used to time localize the synchronization signal, in the face of attenuation, noise, and signal reflections between the base station z and the remote unit x. This is important to ensure close tracking between the remote clock of the remote unit x and the clock of the base station z. To the extent that the main peak of the autocorrelation of the synchronization signal is significantly taller than the other peaks or sidelobes, the matched filter block will have an easier time discerning the main peak from the sidelobes.

FIG. 2 depicts plots of a power spectrum of uniformly spaced tones used to modulate a synchronization waveform with power in dB on the vertical axis and frequency on the horizontal axis. FIG. 2 also depicts an autocorrelation of the same synchronization waveform with power on the vertical axis and time samples on the horizontal axis. The autocorrelation illustrates sidelobes relative to the main or true peak in a matched filter application. The height of the main peak appears only slightly larger in power than the sidelobes, increasing the difficulty of time locating the peak of the synchronization signal. Non-uniform spacing, by contrast, spreads and reduces the sidelobes.

The following analysis for the case of geometrically spaced tones illustrates the fundamental relationship between autocorrelation sidelobes and the spacing that applies to the invention. Any given set of N tones can be described as follows, where f is frequency of the tone Nth tone and s is the spacing between each adjacent tone:

$f_1$=fundamental frequency $f_2 = f_1 + S_1 \ldots$ $fN = f_{N-1} + s_{N-1}$

For the case of geometrically spaced tones, the sidelobes of the matched filtering function are spread into plateaus having nearly constant relative level. The k-th sidelobe plateau is characterized by the following equations, where R is the ratio of the maximum spacing to the minimum spacing between adjacent tones and s is the minimum spacing between adjacent tones:

start time: k/(R*s)

stop time: k/s

Relative level: $(N*k \ln R)^{-1/2}$

In a preferred embodiment of the invention, consistent with the PWAN implementation, s is 3125 Hz. However, s could be any convenient are frequency spacing. N and R are available parameters that provide flexibility for tailoring the characteristics of the matched filtering output. Specifically, the larger N is, the better the suppression of the sidelobes. The larger R is, the better the suppression of the sidelobes, however, the closer sidelobes are in time to the main peak. In a preferred embodiment of the invention, N is 15 tones, and adjacent tones are spaced in prime number multiples of s. Thus, the spacings between adjacent frequencies $f_1$ to $f_{15}$ are equal to s times {1, 3, 5, 7, 11, 13, 17, 19, 23, 29, 31, 37, 41, 43} respectively. Given the prime number set above, R is equal to 43 and the following theoretical parameter values result for the first sidelobe plateau (k=1):

start time: 1/(43*3125)=7.4 micro seconds stop time: 1/3125=320 micro seconds

Relative level: $20 \log_{10} (15* \ln 43)^{-1/2} = -17.5$ dB

FIG. 3 depicts a measured waveform power spectrum with N=15 using prime numbers to modulate the synchronization signal, and the associated matched filtering function. It is apparent that the main peak has significantly greater peak power than the sidelobes, especially compared to the case of uniformly spaced tones. Furthermore, it is apparent that the sidelobes are more distant from the main peak than in the uniformly spaced tone example. These properties are advantageous for more accurately locating the synchronization signal in time for adjusting the input signal to the phase locked loop unit.

Still another alternate embodiment applies the above described invention in the PWAN Frequency Division Duplex Communications System described in the Alamouti, Michaelson et al. patent application cited above.

In an alternate embodiment of the invention, a Fibonacci series is used instead of prime number increments to non-uniformly space the tones. In the fibonacci case, N is 11 tones, and adjacent tones are spaced by the corresponding fibonacci number time s. Thus, the spacings between adjacent frequencies $f_1$ to $f_{11}$ are equal to s times {1, 2, 3, 5, 8, 13, 21, 34, 55, 89} respectively. Given the fibonacci set above, R is equal to 89 and the following theoretical parameter values result for the first sidelobe plateau (k=1):

start time: 1/(89*3125)=3.6 micro seconds stop time: 1/3125=320 micro seconds

Relative level: $20 \log_{10} (15* \ln 89)^{-1/2} = -16.9$ dB

Based on these numbers, the prime number sequence of 15 tones is superior in sidelobe suppression and pushing out the sidelobes in time.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims.

What is claimed is:

1. A method of synchronizing a remote unit to a base station in a bandwidth efficient communication system, comprising the steps of:

generating a clock signal at the base station;

spreading the clock signal over a plurality of non-uniformly spaced discrete tones spaced in prime number increments of a fundamental tone spacing, thus creating a synchronization signal at the base station;

transmitting the synchronization signal from the base station;

receiving the synchronization signal at least one remote unit;

performing matched filtering on the synchronization signal; and generating a remote clock signal in the remote unit, synchronized with the synchronization signal, based on the matched filtering step.

2. The method according to claim 1, further comprising the steps of:

performing an inverse fast fourier transform on the spreaded clock signal to create the synchronization signal at the base station; and performing a fast fourier transform on the received synchronization signal at the remote unit.

3. The method according to claim 2, wherein the matched filtering is performed in the frequency domain in accordance with the convolution theorem.

4. A method of synchronizing a remote unit to a base station in a bandwidth efficient communication system, comprising the steps of:

generating a clock signal at the base station;

spreading the clock signal over a plurality of non-uniformly spaced discrete tones, thus creating a synchronization signal at the base station;

transmitting the synchronization signal from the base station;

receiving the synchronization signal at least one remote unit;

performing matched filtering on the synchronization signal; and generating a remote clock signal in the remote unit, synchronized with the synchronization signal, based on the matched filtering step;

wherein the tones are spaced in prime number increments of a fundamental tone spacing.

5. A method of synchronizing a remote unit to a base station in a bandwidth efficient communication system, comprising the steps of:

generating a clock signal at the base station;

spreading the clock signal over a plurality of non-uniformly spaced discrete tones, thus creating a synchronization signal at the base station;

transmitting the synchronization signal from the base station;

receiving the synchronization signal at least one remote unit;

performing matched filtering on the synchronization signal; and generating a remote clock signal in the remote unit, synchronized with the synchronization signal, based on the matched filtering step;

wherein the tones are spaced in a Fibonacci series times a fundamental tone spacing.

6. The method according to claim 1, wherein at least one matched filter implements the matched filtering.

7. The method according to claim 6, wherein the at least one matched filter determine the location of the synchronization signal and determine timing error between the synchronization waveform and the remote clock.

8. The method according to claim 7, wherein a phase locked loop receives the timing error from the at least on matched filter and adjusts the frequency and phase of the remote clock to closely approximate the synchronization signal.

9. A system of synchronizing a remote unit to a base station in a bandwidth efficient communication system, comprising:

means for generating a clock signal at the base station;

means for spreading the clock signal over a plurality of non-uniformly spaced discrete tones spaced in prime number increments of a fundamental tone spacing, thus creating a synchronization signal at the base station;

means for transmitting the synchronization signal from the base station;

means for receiving the synchronization signal at least one remote unit;

means for performing matched filtering on the synchronization signal; and means for generating a remote clock signal in the remote unit, synchronized with the synchronization signal, based on the matched filter output.

10. The system according to claim 9, further comprising:

means for performing an inverse fast fourier transform on the spreaded clock signal to create the synchronization signal at the base station; and means for performing a fast fourier transform on the received synchronization signal at the remote unit.

11. The system according to claim 10, wherein the matched filtering is performed in the frequency domain in accordance with the convolution theorem.

12. A system of synchronizing a remote unit to a base station in a bandwidth efficient communication system, comprising:

means for generating a clock signal at the base station;

means for spreading the clock signal over a plurality of non-uniformly spaced discrete tones, thus creating a synchronization signal at the base station;

means for transmitting the synchronization signal from the base station;

means for receiving the synchronization signal at least one remote unit;

means for performing matched filtering on the synchronization signal; and means for generating a remote clock signal in the remote unit, synchronized with the synchronization signal, based on the matched filter output;

wherein the tones are spaced in prime number increments of a fundamental tone spacing.

13. A system of synchronizing a remote unit to a base station in a bandwidth efficient communication system, comprising:

means for generating a clock signal at the base station;

means for spreading the clock signal over a plurality of non-uniformly spaced discrete tones, thus creating a synchronization signal at the base station;

means for transmitting the synchronization signal from the base station;

means for receiving the synchronization signal at least one remote unit;

means for performing matched filtering on the synchronization signal; and means for generating a remote clock signal in the remote unit, synchronized with the synchronization signal, based on the matched filter output;

wherein the tones are spaced in a Fibonacci series times a fundamental tone spacing.

14. The system according to claim 9, wherein at least one matched filter implements the matched filtering.

15. The system according to claim 14, wherein the at least one matched filter determine the location of the synchronization signal and determine timing error between the synchronization signal and the remote clock.

16. The system according to claim 15, wherein a phase locked loop receives the timing error from the at least on matched filter and adjusts the frequency and phase of the remote clock to closely approximate the synchronization signal.

* * * * *